US007800841B2

(12) United States Patent
Wang et al.

(10) Patent No.: US 7,800,841 B2
(45) Date of Patent: Sep. 21, 2010

(54) OPTICAL OBJECT DISTANCE SIMULATION DEVICE FOR REDUCING TOTAL OPTICAL PATH

(75) Inventors: Bily Wang, Hsin Chu (TW); Kuei-Pao Chen, Hsin Chu (TW); Chih-Ming Wang, Hsinchu (TW); Jui-Wen Pan, Sinyi Township, Nantou County (TW)

(73) Assignee: Youngtek Electronics Corporation, Hsinchu (TW)

( * ) Notice: Subject to any disclaimer, the term of this patent is extended or adjusted under 35 U.S.C. 154(b) by 87 days.

(21) Appl. No.: 12/285,035

(22) Filed: Sep. 29, 2008

(65) Prior Publication Data

US 2009/0213474 A1 Aug. 27, 2009

(30) Foreign Application Priority Data

Feb. 27, 2008 (TW) .............................. 97106767 A

(51) Int. Cl.
*G02B 3/08* (2006.01)

(52) U.S. Cl. ........................ 359/743; 359/784; 359/785

(58) Field of Classification Search ................. 359/743, 359/784, 785, 782, 781, 773, 774, 775, 686, 359/687, 688

See application file for complete search history.

(56) References Cited

U.S. PATENT DOCUMENTS 6,124,978 A * 9/2000 Yoneyama .................. 359/649
6,166,861 A * 12/2000 Koizumi ..................... 359/644
7,365,912 B2 * 4/2008 Lee ............................ 359/680

* cited by examiner

*Primary Examiner*—Timothy J Thompson
(74) *Attorney, Agent, or Firm*—Rosenberg, Klein & Lee

(57) ABSTRACT

An optical object distance simulation device for reducing total optical path includes: a lens, an achromatic lens set, a first image lens, and a second image lens. The achromatic lens set disposes beside one side of the lens, the first image lens disposes beside one side of the achromatic lens set, and the second image lens disposes beside one side of the first image lens. The achromatic lens set is composed of a first lens and a second lens. The first lens is a double-concave lens. The second lens is a double-convex lens. One concave face of the double-concave tightly contacts with one convex face of the double-convex lens. Therefore, the lens, the achromatic lens set, the first image lens, and the second image lens match with each other in order to simulate real object distance for reducing an object distance between a test camera lens and a corresponding chart.

7 Claims, 4 Drawing Sheets

OPTICAL OBJECT DISTANCE SIMULATION DEVICE FOR REDUCING TOTAL OPTICAL PATH

BACKGROUND OF THE INVENTION

1. Field of the Invention

The present invention relates to an optical object distance simulation device for reducing total optical path, and particularly relates to a device for simulating real object distance in order to reduce an object distance between a test camera lens and a corresponding chart.

2. Description of Related Art

Referring to FIG. 1, a known optical lens-testing device is disclosed. The device has a light-emitting element 90, a chart 91, and a lens 92. The light-emitting element 90 projects light beams onto the chart 91, and a real object distance d between the lens 92 and the chart 91 can be adjusted according to different testing needs, for testing the quality of the optical lens 92. An effective FOV (Field of View) of the optical lens 92 corresponding to the chart 91 is shown by the dotted lines in FIG. 1.

However, the real object distance d between the optical lens 92 and the chart 91 is too long, so that the testing space required is too large. Hence, the known optical lens-testing device is inconvenient and not economic.

SUMMARY OF THE INVENTION

One particular aspect of the present invention is to provide an optical object distance simulation device for reducing total optical path. The optical object distance simulation device reduces a real object distance between a lens and a chart by a method of simulating a real object distance. In other words, an optical lens module composed of a plurality of optical lenses is disposed between the optical lens and the chart (a test chart, a test object, or a test target) for simulating the real object distance, so as to reduce the required testing space.

In order to achieve the above-mentioned aspects, the present invention provides an optical object distance simulation device for reducing total optical path, including: a lens, an achromatic lens set, a first image lens, and a second image lens. The achromatic lens set is disposed beside one side of the lens, the first image lens is disposed beside one side of the achromatic lens set, and the second image lens is disposed beside one side of the first image lens. In addition, the achromatic lens set is composed of a first lens and a second lens. The first lens is a double-concave lens, and the second lens is a double-convex lens. The edge of one concave face of the lens contacts with the edge of one concave face of the double-concave lens to form a gap between the concave-convex lens and the double-concave lens. The other concave face of the double-concave tightly contacts with one convex face of the double-convex lens.

Therefore, the lens, the achromatic lens set, the first image lens, and the second image lens are matched with each other in order to simulate real object distance for reducing an object distance between a test camera lens and a corresponding chart.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED EMBODIMENTS

Figure 1:
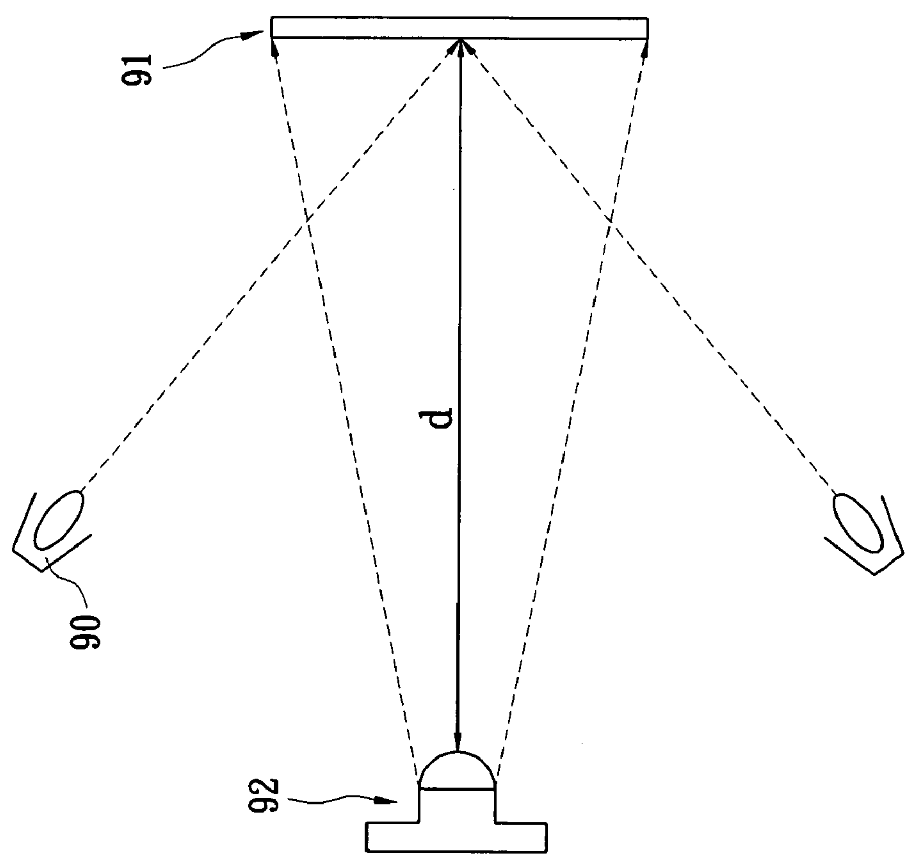
FIG. 1 is a schematic diagram of an optical lens-testing device of the prior art.
Figure 2:
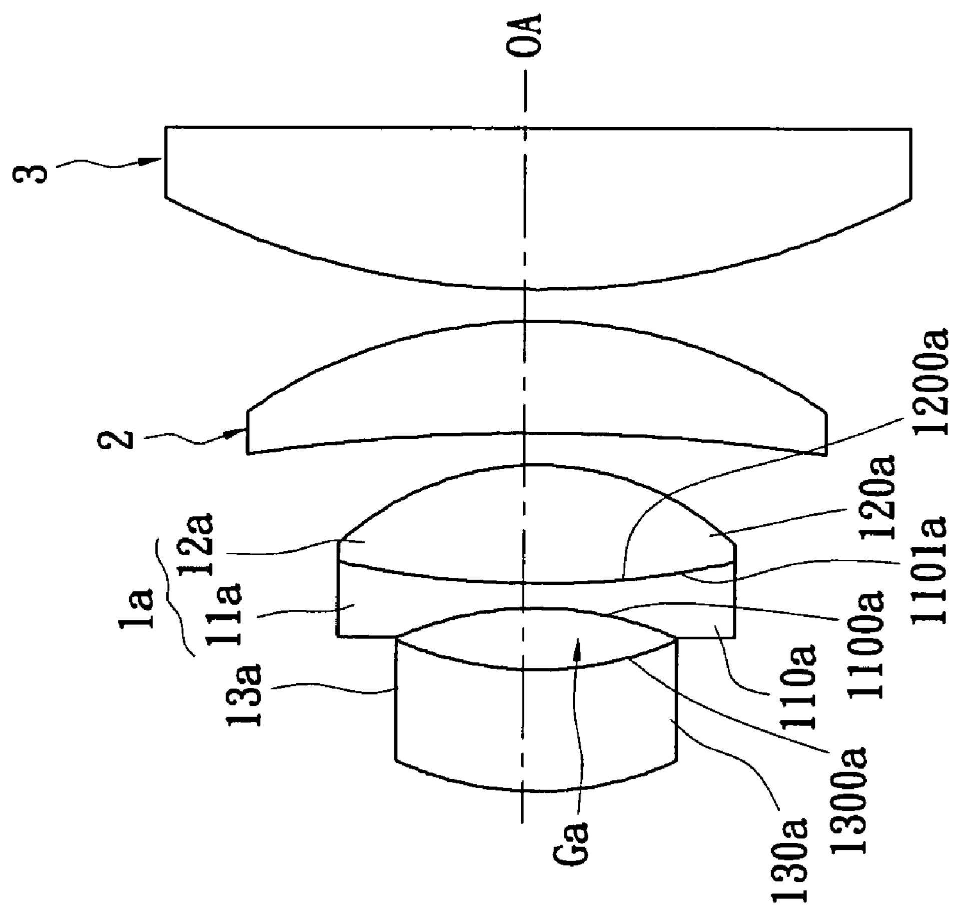
FIG. 2 is a side, schematic view of an optical object distance simulation device for reducing total optical path according to the first embodiment of the present invention.

Referring to FIG. 2, the first embodiment of the present invention provides an optical object distance simulation device for reducing total optical path, including: a lens 13*a*, an achromatic lens set 1*a*, a first image lens 2, and a second image lens 3. In addition, the lens 13*a*, the achromatic lens set 1*a*, the first image lens 2, and the second image lens 3 are disposed on the same optical axle OA. The lens 13*a*, the achromatic lens set 1*a*, the first image lens 2, and the second image lens 3 are spherical lenses.

Moreover, the lens 13*a* is a concave-convex lens 130*a*. The achromatic lens set 1*a* is composed of a first lens 11*a* and a second lens 12*a*. The first lens 11*a* is a double-concave lens 10*a*, and the second lens 12*a* is a double-convex lens 120*a*. The edge of one concave face 1300*a* of the concave-convex lens 130*a* contacts with the edge of one concave face 1100*a* of the double-concave lens 110*a* to form a gap Ga between the concave-convex lens 130*a* and the double-concave lens 110*a*. The other concave face 1101*a* of the double-concave 110*a* tightly contacts with one convex face 1200*a* of the double-convex lens 120*a*.

Furthermore, the achromatic lens set 1*a* is disposed beside one side of the lens 13*a*. The first image lens 2 is disposed beside one side of the achromatic lens set 1*a*, and the second image lens 3 is disposed beside one side of the first image lens 2. In other words, the first image lens 2 is disposed between the achromatic lens set 1*a* and the second image lens 3. In addition, the first image lens 2 can be a concave-convex lens, and the second image lens 3 can be a single convex lens.

Therefore, the lens 13*a*, the achromatic lens set 1*a*, the first image lens 2, and the second image lens 3 are matched with each other in order to simulate real object distance for reducing an object distance between a test camera lens (not shown) and a corresponding chart (not shown).

Figure 3B:
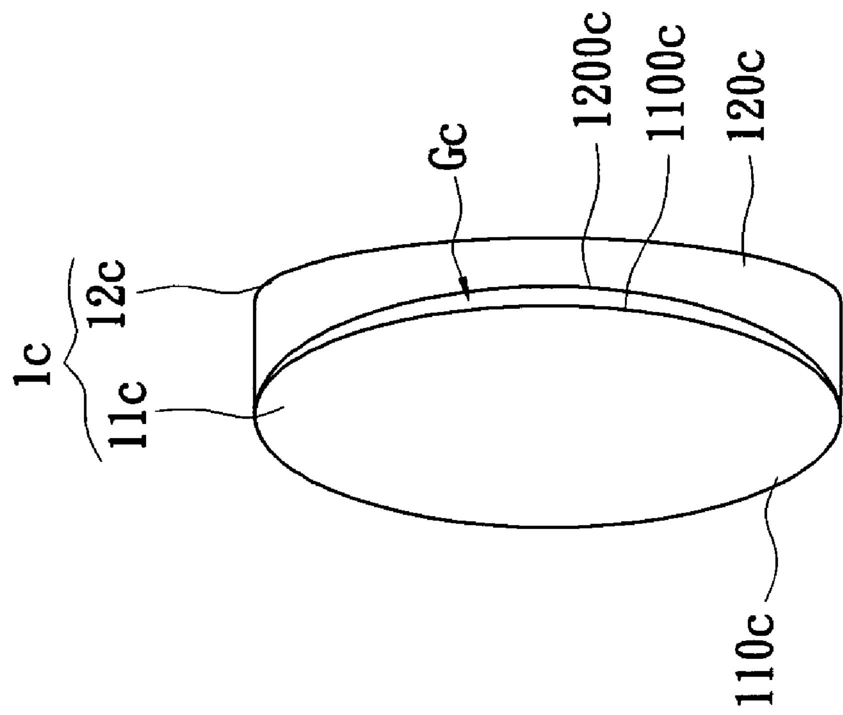
FIG. 3B is a side, schematic view of an achromatic lens set according to the third embodiment of the present invention.
Figure 3A:
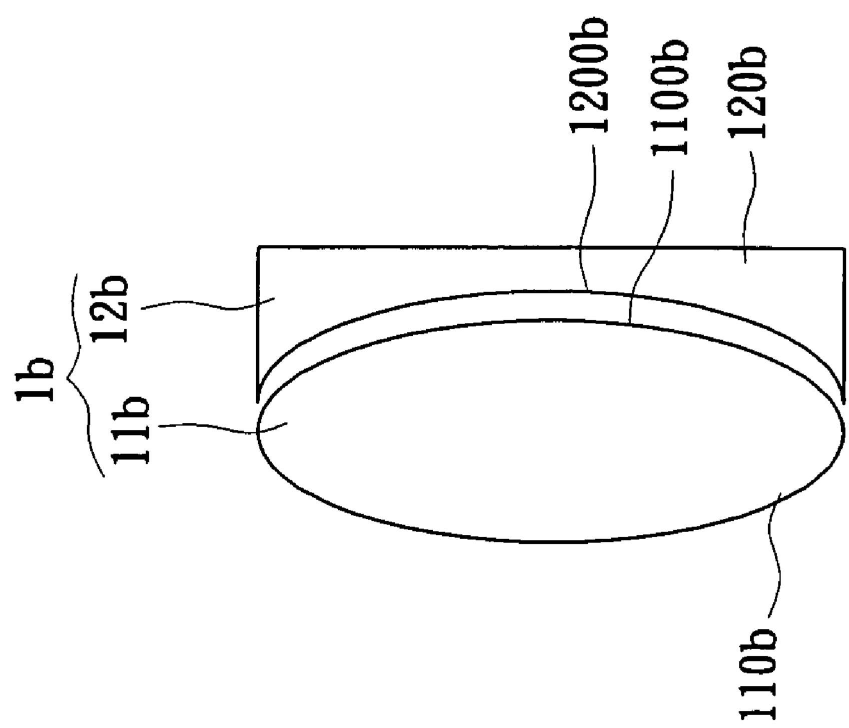
FIG. 3A is a side, schematic view of an achromatic lens set according to the second embodiment of the present invention.

Referring to FIG. 3A, the second embodiment provides an achromatic lens set 1*b* that is composed of a first lens 11*b* and a second lens 12*b*. The first lens 11*b* is a double-convex lens 110*b*, and the second lens 12*b* is a single concave lens 120*b* disposed beside one side of the double-convex lens 110*b*. A concave face 1200*b* of the single concave lens 120*b* faces a convex face 1100*b* of the double-convex lens 110*b*.

Referring to FIG. 3B, the third embodiment provides an achromatic lens set 1*c* that is composed of a first lens 11*c* and a second lens 12*c*. The first lens 11*c* is a double-convex lens 110*c*, and the second lens 12*c* is a double-concave lens 120*c*. The edge of one concave face 1200*c* of the double-concave lens 120*c* contacts with the edge of one convex face 1100*c* of the double-convex lens 110*c* to form a gap Gc between the double-convex lens 110*c* and the double-concave lens 120*c*.

Figure 3D:
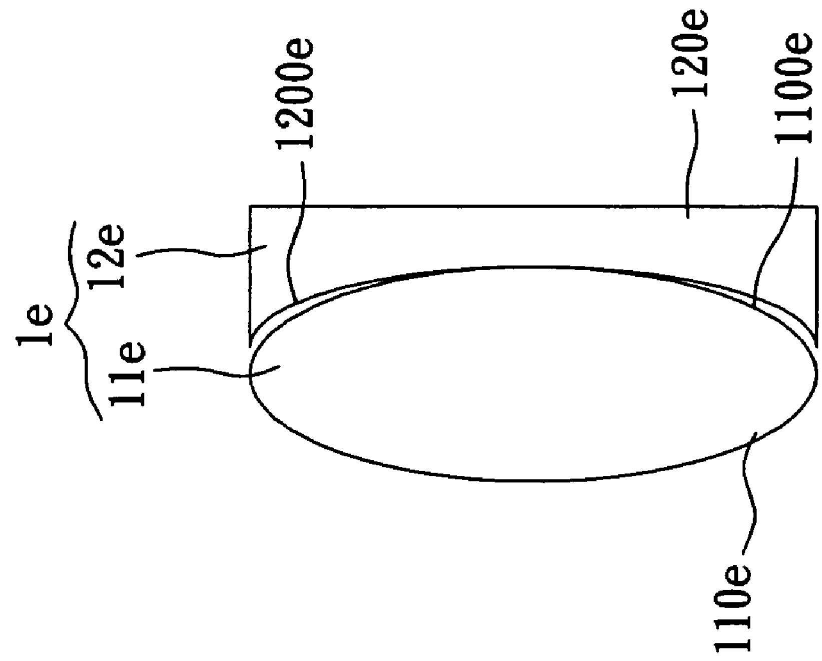
FIG. 3D is a side, schematic view of an achromatic lens set according to the fifth embodiment of the present invention.
Figure 3C:
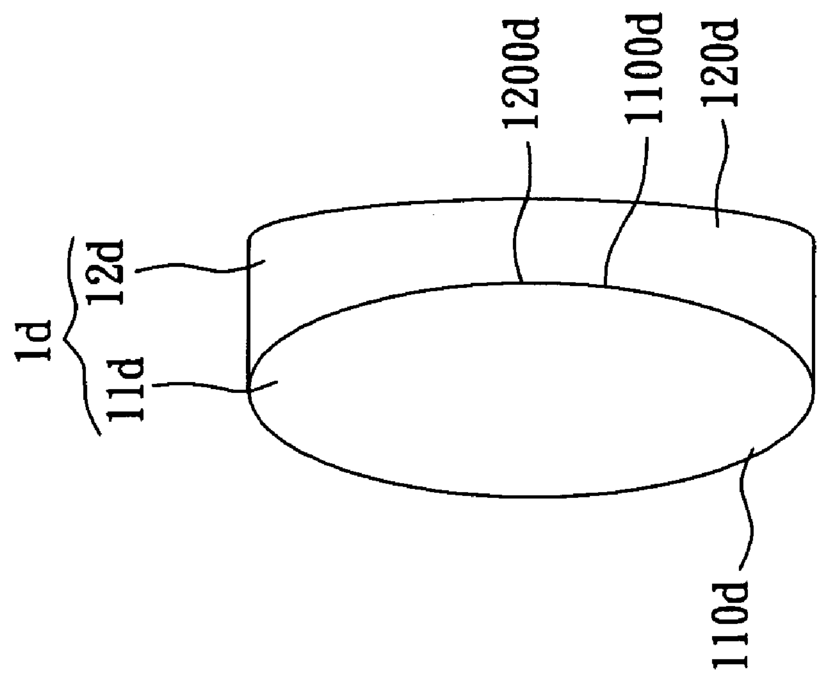
FIG. 3C is a side, schematic view of an achromatic lens set according to the fourth embodiment of the present invention.

Referring to FIG. 3C, the fourth embodiment provides an achromatic lens set 1*d* that is composed of a first lens 11*d* and a second lens 12*d*. The first lens 11*d* is a double-convex lens 110*d*, and the second lens 12*d* is a double-concave lens 120*d*. One concave face 1200*d* of the double-concave lens 120*d* tightly contacts with one convex face 1100*d* of the double-convex lens 110*d*.

Referring to FIG. 3D, the fifth embodiment provides an achromatic lens set 1*e* that is composed of a first lens 11*e* and a second lens 12*e*. The first lens 11*e* is a double-convex lens 110*e*, and the second lens 12*e* is a single concave lens 120*e*. The center of a concave face 1200*e* of the single concave lens 120*e* tightly contacts with the center of one convex face 1100*e* of the double-convex lens 110*e*.

In other words, the optical object distance simulation device reduces a real object distance between a lens and a chart by a method of simulating a real object distance. In other words, an optical lens module composed of a plurality of optical lenses is disposed between the optical lens and the chart (a test chart, a test object, or a test target) for simulating the real object distance, so as to reduce the required testing space.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An optical object distance simulation device for reducing total optical path, comprising:

a lens that is a concave-convex lens;

an achromatic lens set disposed beside one side of the lens, wherein the achromatic lens set is composed of a first lens and a second lens, the first lens is a double-concave lens, the second lens is a double-convex lens, the edge of one concave face of the concave-convex lens contacts with the edge of one concave face of the double-concave lens to form a gap between the concave-convex lens and the double-concave lens, and the other concave face of the double-concave tightly contacts with one convex face of the double-convex lens;

a first image lens disposed beside one side of the achromatic lens set; and a second image lens disposed beside one side of the first image lens;

whereby, the lens, the achromatic lens set, the first image lens, and the second image lens are matched with each other in order to simulate real object distance for reducing an object distance between a test camera lens and a corresponding chart.

2. The optical object distance simulation device as claimed in claim 1, wherein the lens, the achromatic lens set, the first image lens, and the second image lens are disposed on the same optical axle.

3. The optical object distance simulation device as claimed in claim 1, wherein the first image lens is a concave-convex lens.

4. The optical object distance simulation device as claimed in claim 1, wherein the second image lens is a single convex lens.

5. The optical object distance simulation device as claimed in claim 1, wherein the lens, the achromatic lens set, the first image lens, and the second image lens are spherical lenses.

6. An optical object distance simulation device for reducing total optical path, comprising:

a lens;

an achromatic lens set disposed beside one side of the lens, wherein the achromatic lens set is composed of a first lens and a second lens, the first lens is a double-convex lens, the second lens is a double-concave lens, and the edge of one concave face of the double-concave lens contacts with the edge of one convex face of the double-convex lens to form a gap between the double-convex lens and the double-concave lens;

a first image lens disposed beside one side of the achromatic lens set; and a second image lens disposed beside one side of the first image lens;

whereby, the lens, the achromatic lens set, the first image lens, and the second image lens are matched with each other in order to simulate real object distance for reducing an object distance between a test camera lens and a corresponding chart.

7. An optical object distance simulation device for reducing total optical path, comprising:

a lens;

an achromatic lens set disposed beside one side of the lens, wherein the achromatic lens set is composed of a first lens and a second lens, the first lens is a double-convex lens, the second lens is a single concave lens, and the center of a concave face of the single concave lens tightly contacts with the center of one convex face of the double-convex lens;

a first image lens disposed beside one side of the achromatic lens set; and a second image lens disposed beside one side of the first image lens;

whereby, the lens, the achromatic lens set, the first image lens, and the second image lens are matched with each other in order to simulate real object distance for reducing an object distance between a test camera lens and a corresponding chart.

* * * * *